United States Patent
Issa et al.

[19]

[11] Patent Number: 6,093,979
[45] Date of Patent: *Jul. 25, 2000

[54] CHANNEL EXPANDER FOR REMOTELY CONTROLLED AUTOMOTIVE SECURITY AND CONVENIENCE SYSTEMS

[76] Inventors: Darrell E. Issa; Jerry W. Birchfield; Glenn Busse; Mark Rutledge, all of 2560 Progress St., Vista, Calif. 92083

[ * ] Notice: This patent is subject to a terminal disclaimer.

[21] Appl. No.: 09/318,207

[22] Filed: May 25, 1999

Related U.S. Application Data

[63] Continuation of application No. 08/866,655, May 30, 1997, Pat. No. 5,907,195, which is a continuation-in-part of application No. 08/866,824, May 29, 1997, abandoned.

[51] Int. Cl.$^7$ ...................................................... B60Q 1/00

[52] U.S. Cl. ........................ 307/10.3; 180/287; 340/426; 340/825.72

[58] Field of Search ................................. 307/10.1–10.6; 180/287; 340/425.5, 426, 430, 825.3–825.32, 825.22, 825.69, 825.72; 370/366, 336, 330, 436, 486, 229, 329; 375/200

[56] References Cited

U.S. PATENT DOCUMENTS

| | | | |
|---|---|---|---|
| 3,947,819 | 3/1976 | Wells | 340/825.22 |
| 4,020,464 | 4/1977 | Wells | 340/825.22 |
| 4,597,075 | 6/1986 | Isreal | 370/366 |
| 4,794,368 | 12/1988 | Grossheim . | |
| 4,887,064 | 12/1989 | Drori . | |
| 4,922,224 | 5/1990 | Drori . | |
| 5,146,215 | 9/1992 | Drori . | |
| 5,155,741 | 10/1992 | Waters et al. | 375/200 |
| 5,467,070 | 11/1995 | Drori . | |
| 5,650,774 | 7/1997 | Drori | 340/825.32 |
| 5,907,195 | 5/1999 | Issa et al. | 307/10.3 |

OTHER PUBLICATIONS

Quantum tem function Remote Adapter instruction manual. Product of Vehicle Security Electronics, Inc.

Operation manual for Directed Electronics' model No. 528T. Dated 1991. Author is Directed Electronics, Inc. Relevant p. 1.

Installation manual for Directed Electronics' Steal Stopper model PS–1. No date available. Believed to have been published at least as early as May 29, 1996. Author is Directed Electronics, Inc. Relevant p. 6.

Universal alternate button adapter module, Quantum model No. VS–8468. No date available. Believed to have been published at least as early as May 29, 1996. Author is Vehicle Security Electronics, Relevant pp. 1–8.

Schematic of Astroguard's model BB1. Dated 1981. Author is Astro–Guard, Inc. Relevant p. 1 See installer adjustable entry delay and siren duration 500k ohm potentiometers.

Schematic of Astroguard's model Black Bart Bobcat. Dated 1983. Author is AstroGuard, Inc. Relevant p. 1. See installer adjustable entry delay and siren duration 500k ohm potentiometers.

Schematic of Directed Electronics' model No. 3000–6000. No date available. Believed to have been published at least as early as May 29, 1996. Author is Directed Electronics, Inc. Relevant p. 1. See installer adjustable delay and siren duration potentiometers R38, R16, R27, and R31.

(List continued on next page.)

*Primary Examiner*—Richard T. Elms

[57] ABSTRACT

A vehicle convenience system comprising a wireless transmitter, having at least one switch therein, for communicating multiple channel commands to an expander, the expander responsive to activation of the transmitter and the expander having at least one expander output responsive to the channel commands received from the transmitter; said expander outputs being programmable to at least one user selectable mode.

32 Claims, 2 Drawing Sheets

OTHER PUBLICATIONS

Operation description of Directed Electronics' model no SS6000F. Dated 1988. Author is Directed Electronics, Inc. Relevant p. 1 and 2 describing exit and entry delays.

Schematic of Directed Electronics' model no. 4000. Dated 1985. Relevant p. 1. See installer adjustable delays and siren duration 500k ohm potentiometers.

Installation instructions and schematic for BMW security alarm system. No date available. Believed to have been published at least as early as May 29, 1996. Author is Directed Electronics, Inc. Relevant p. 4. See installer adjustable delays and siren output.

Specification sheet for Directed Electronics' model No. SS70 and SS80. Dated 1986. Author is Directed Electronics, Inc. Relevant p. 1. See installer adjustable delays and siren duration 500k ohm potentiometers.

CHANNEL EXPANDER FOR REMOTELY CONTROLLED AUTOMOTIVE SECURITY AND CONVENIENCE SYSTEMS

RELATION TO OTHER PATENTS AND APPLICATIONS

This patent application is a continuation of U.S. patent application Ser. No. 08/866,655, now U.S. Pat. No. 5,907,195, filed on May 30, 1997; which is a continuation-in-part of U.S. patent application Ser. No. 08/866,824, filed on May 29, 1997, now abandoned.

BACKGROUND OF THE INVENTION

1. Field of the Invention

This invention relates to systems having the capability of remotely operating electronic functions of a vehicle. The device of the present invention allows the operator to control a number of functions in a system exceeding a limited number of control outputs of said system.

2. Description of the Prior Art

Some of the features of the automotive security and convenience systems include the ability to lock and unlock doors, fully or partially roll down windows, turn on lights of the vehicle and the like. The automotive security and convenience systems presently sold have a limited number of remotely controlled outputs (output channels). However, some applications require more output channels than available in the chosen security and convenience system. Therefore, these applications employ channel expanders that allow one output channel to expand and control multiple outputs.

Channel expanders have been known and used in the industry. Generally they allow one output channel to be expanded to control a number of channels. However, the channel expanders of the prior art are not user friendly. As an example, in a six-channel expander of the prior art, the unit resets to expander output one after its function is performed. Therefore, if the user commonly used expander output three, he/she would have to access that output by pressing buttons on his/her remote control multiple times. This is tedious and at times involves misapplication and operation of an undesired output or function such as rolling windows down while it is raining. Another undesirable feature of the prior art expanders is that the user must scroll through the unused expander outputs prior to reaching the desired channel. More particularly, if the channel expander has ten outputs, only three of which are utilized, then to control output two, immediately after controlling output three, the user must scroll or loop through eight outputs, i.e. outputs four through one.

The device of the present invention overcomes the above-described deficiencies in the prior art. The device of the present invention has a selectable "memory-mode" such that the device does not reset to channel one automatically. Instead, it remembers the last expander output called by the remote transmitter and thereafter it defaults and operates that output again unless another output is selected. Furthermore, the device of the present invention has an "off-mode". This mode allows the user to delete the unused expander outputs from its loop. Therefore, in a ten-output expander, where only three outputs are used, the loop consists of scrolling from output one to output two to output three and back to output one. The user is not compelled to scroll through inactive and unassigned expander outputs four through ten just to get to channel one. Another novel aspect of the present invention is that each of the channel expander outputs is programmable to one of multiple states/modes. One of the modes is an "off-mode". The "off-mode" makes that output unused and the user thereafter does not have to scroll through it to reach another output. The next mode is a "latch-mode". "Latch-mode" turns outputs on and off and remains in the assigned on or off state until changed again. The next mode is the "timed-mode". This mode turns an output on for a period of time such as thirty-seconds timed, sixty-seconds timed and/or ninety-seconds timed, although it can be any period of time. This state is useful for activating lights or any other device for a period of time. Another mode is "latch-reset-with-ignition-mode". This mode is an on/off switch. When this type of output is used, it will turn on if it was off, or off if it was on. It will only change states if it is accessed again. Another mode is "validity-mode". This mode provides a signal as long as the button(s) of the remote control is being activated or pressed. Finally the last mode is a "pulse-mode". This mode operates a function upon depression and release of a button on the remote control transmitter. The result is a control signal for a period of one second. The pulse and validity modes are default modes of the present invention.

SUMMARY OF THE INVENTION

It is the object of the present invention to solve the heretofore-described problems. It is the object of the present invention to provide an expander having multiple, assignable modes/states, including, but not limited to "off-mode", "latch-reset-with-ignition-mode", "latch-mode", "timed-mode", "pulse-mode", "validity-mode" and "memory-mode" programmable for each one of its outputs. It is the object of this invention to provide a channel expander having multiple expander outputs controllable from one expander output of the security and/or convenience system. It is an object of the present invention to allow the user to delete the unused expander outputs so that he/she does not have to scroll through the unused expander outputs to reach the desired expander output. It is also the object of this invention to allow the user to activate a desired expander output by activating one or more buttons/switches on his/her remote control transmitter. It is the object of the present invention to provide a memory-mode to allow the expander to remember the last expander output. This allows the user to have instant access to the last output activated and it can also serve as a ready control for the more commonly exercised output. It is the object of the present to provide a latch-mode to turn desired features and/or operations on and off from the remote transmitter. It is the object of this invention to provide a latch-reset-with-ignition-mode to turn on and off desired features and/or operations on and off from the transmitter and to have these features reset when the ignition is turned off. It is the object of this invention to provide a pulse-mode to supply a pulse on the desired expander output responsive to a command from a remote transmitter. It is the object of this invention to provide a validity-mode to provide an output on the desired expander output for the duration of engagement of the commanding remote transmitter switch(es).

These and other objects of the invention may be found from a fair reading of the description of the preferred embodiment taken along with the drawings appended hereto. The scope of protection sought by the inventors may be gleaned from a fair reading of the claims that conclude this specification.

DETAILED DESCRIPTION OF THE PREFERRED EMBODIMENT

Figure 1:
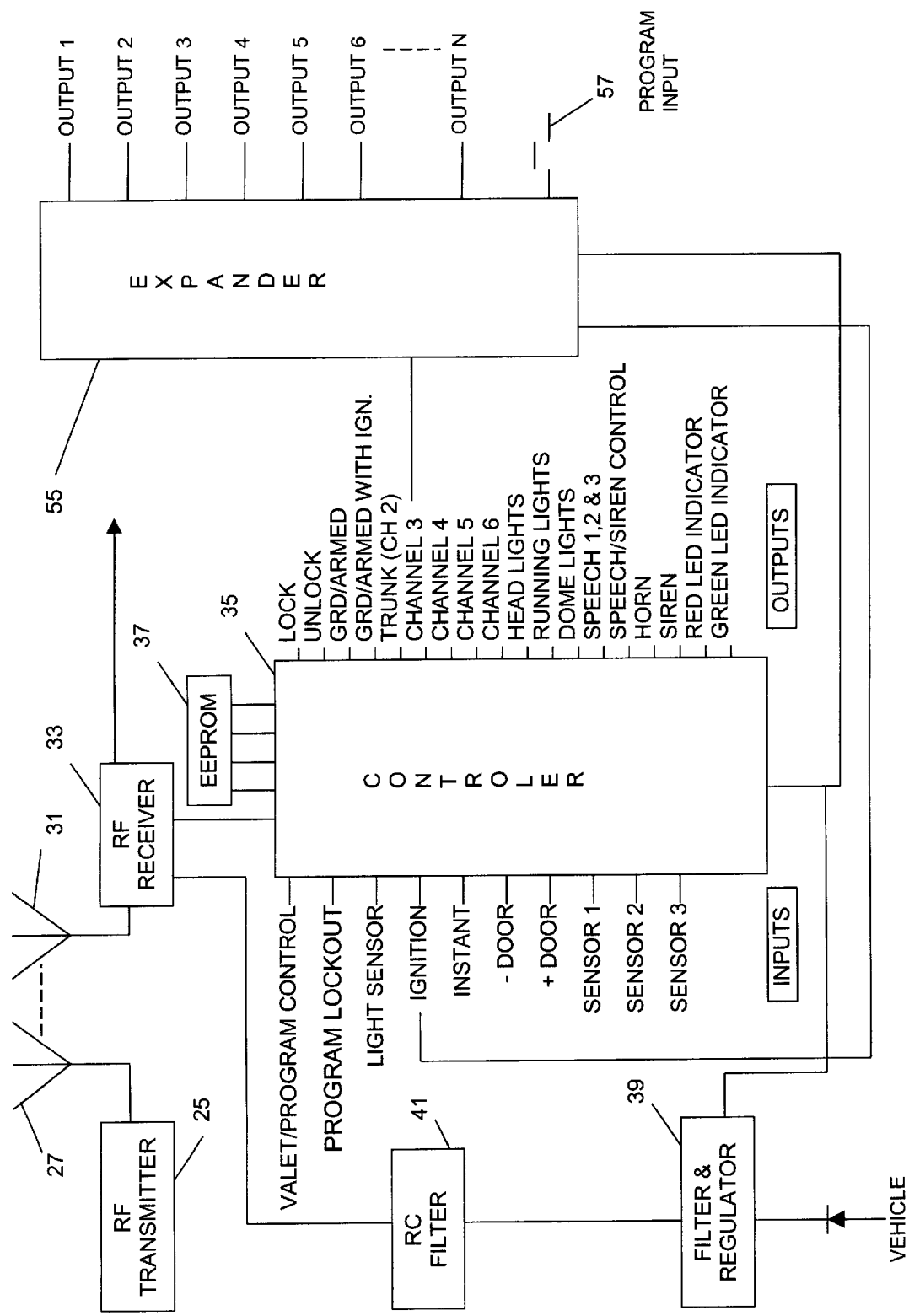
FIG. 1 is a representation of the block diagram of the present invention.

FIG. 1 is a block diagram of the present invention. In one embodiment, the system of the present invention consists of three broad components: remote control transmitter 25, controller module 35 and channel expander 55. Transmitter 25 customarily employs at least two switches/buttons 26. With two switches one can activate three different channels/commands, i.e. by activating button one, button two, and button one and two. Transmitter 25, depending on which channel was activated by the user, encodes via a resident encoder 28 a high frequency carrier with certain digital information indicative of the serial number of transmitter 25, the channel executed and other header and footer information. This encoded high frequency signal is then transmitted to controller 35 via transmitter's 25 antenna 27. In the preferred embodiment, the signal is received and decoded by controller 35 via controller antenna 31 and RF receiver 33, fed by vehicle power that is filtered and regulated via filter regulator 39 and RC-filter 41. Inside controller 35 is a decoder 30 that decodes the digital information from the signal into its various components. A more detailed description of operation and features of controller 35 can be found by referring to the U.S. Pat. No. 5,534,845, which Patent if fully incorporated herein by reference.

Before controller 35 responds to the commands that it received it checks the security code of the issuing transmitter 25 and compares it to a table of authorized security codes programmed therein. The memory storing these authorized codes may be local to controller 35 or reside in an EEPROM 37. Multiple transmitters 25 may be programmed to operate controller 35.

Assuming transmitter 25 is authorized to operate controller 35, controller 35 will execute the command that it received from this transmitter 25. In the preferred embodiment, channel one command, in response to activation of button one in transmitter 25, is an arm-disarm command. It arms and disarms the alarm system and controller 35. Channel two command, in response to activation of button two in transmitter 25, is a time delay channel. This is ordinarily used to release the trunk latch. In the preferred embodiment a 1.5-second delay is employed so that an accidental push of button two does not release the trunk. Finally, channel three is usually an instant trigger channel capable of operating other functions about the vehicle. The system shown in FIG. 1 has six output channels. Other systems may have more or less output channels.

In a system where the number of output channels required by the user for control of multiple functions in and about the area controlled by the system is insufficient, an expander 55 is employed. Expander 55 may employ one to 'n' outputs. These expanders may also be cascaded to achieve higher channel counts.

This allows a single channel command from transmitter 25 to access expander 55, via one of controller's 35 output channels also referred to as expander trigger output (in the preferred embodiment via controller channel three). The instant output signal of expander trigger output triggers or wakes expander 55 to count the number of times controller channel-three command, resulting in expander-trigger-output, was activated by transmitter 25. Accordingly, if expander trigger output is activated once, expander 55 will recognize it to trigger its expander output one. If expander output trigger is activated consecutively twice, expander 55 will recognize it to trigger its expander output two. If expander trigger output is activated three times, expander 55 will recognize it to trigger its expander output three, . . . etc.

As described above, in the preferred embodiment, expander 55 is activated by transmitting channel three command from remote transmitter 25 that in turn activates expander trigger output of controller 35. Expander 55 receives this output. Before deciding which of the 'n' expander outputs the user wanted to command, it will count the number of times expander trigger output is activated as result of transmitter 25 sending the channel-three command. Expander 55 does not operate any of its outputs until the user stops sending channel three commands from transmitter 25 for a certain period of time. In the preferred embodiment this period of time is 1.5 seconds. Expander 55 activates one of the appropriate expander outputs according to the number of times it sensed expander trigger output. For example if transmitter 25 sent four channel-three commands to controller 35, wherein no one channel command lagged 1.5 seconds from any other, expander 55 will register that to be a command to operate expander output four.

Expander 55 also employs a memory-mode. In this mode expander 55 remembers, in an internal or external memory, the last expander output that was used by it. This is particularly useful when the user wishes to exercise a certain expander output more often than others. Accordingly, in the expanders of the prior art, if the user uses expander output five more often then other outputs, he/she will have to transmit channel three of his/her remote five times, each time he/she wants to send that command, because the conventional expander will always count from expander output one up. In the device of the present invention, expander 55 remembers the last expander output the user used and the next time the user transmits a channel three command, once, from his/her remote transmitter 25, the last expander output, used the time before, will be activated again. In the device of the preferred embodiment, controller 35 and/or expander 55 confirm to the user the expander output number by flashing parking lights and/or sounding an audio transducer such as a siren or speaker of the vehicle corresponding to the expander output number. This way the user knows what expander output was exercised last. The confirmation may be selectively limited to an audio free response as well. In the preferred embodiment that is achieved by activating channel two and channel one consecutively.

In another embodiment of the present invention, the user can control a specific expander 55 output by activating combinations of transmitter 25 switches/buttons 26 (the terms are used interchangeably) to control certain expander 55 outputs. For example, in a six-channel controller 35 and a four-button transmitter 25, at least seven channels of expander 55 can be controlled directly from transmitter 25. A four-button transmitter 25 can issue at least seven commands, even after dedicating button one to channel one arm/disarm command and limiting channel commands to no more than three buttons. Accordingly, any output of a six-channel expander 55 can be controlled by a sequence of buttons 26 of transmitter 25. For example, expander output six might be operated by pressing buttons three and four.

Another novel aspect of the present invention is the ability to program the output of each channel of expander 55. There are multiple types of outputs/modes (the terms are used interchangeably). One is "validity-mode". It is an output that lasts as long as the user holds down or activates the buttons/switches of transmitter 25. If button 26 is momentarily held down or activated, a one-second pulse will be generated. Conversely, if button 26 is continuously held down or activated, the corresponding channel output from expander 55 will be continuously generated. For example, if expander 55 output two is programmed to be a "validity" output, its output will be active (low or high) as the user continues to hold down button(s) 26 of transmitter 25. To issue a "validity" command to expander 55 output two, buttons one and two (in a two button transmitter) are pressed once and released and then they are pressed again to reach expander 55 output two and are held down for as long as the user needs/wants a "validity" output on expander 55 output two. "Validity-mode" is very useful for functions that require a continuous control of the response to the command. One such application is the control of power windows wherein the windows are rolled up or down as long as transmitter 25 buttons 26 are activated. Other application may also appear where it is desirable for the user has to press button 26 for a certain period of time (1.5 seconds as an example) to make certain that the activation of the function is controlled. Moreover, the "pulse-mode" activates the expander 55 output for a predetermined amount of time in response to receipt of channel-three command from transmitter 25. A momentary activation of buttons one and two (in the preferred embodiment) will generate a pulse output on the selected expander 55 output.

Another programmable state/mode of expander 55 channel(s) is the "latch-reset-with-ignition-mode". This provides a latching output as an off/on switch. Whenever a latching channel is used, it will toggle or turn on if it was off, or off if it was on. This particular latching output will turn off automatically (if it is on); each time the ignition is turned on and then back off.

Another programmable state/mode of expander 55 output (s) is the "standard-latch-mode". It is also a toggle or an off/on switch. When this type of output is used, it will turn on if it was off, or off if it was on. It will only change state if it is accessed again. Care should be taken when using this type of output, since it will remain on until it is turned off.

Another programmable states/modes of expander 55 output(s) are the "30, 60 and 90 second timed" states/modes. When these states/modes are activated, the output will turn on for the programmed amount of time such as 30, 60 or 90 seconds and shut off. The amount of time can be varied to any desirable period.

Finally, and importantly, the other programmable state of expander 55 output(s) is the "off-mode". This is very useful where only a part of the available expander 55 outputs are used. For example, in expanders of the prior art without the "off" mode, if the user last used expander output two and now would like to control expander output one, in a six output expander, the user must scroll from expander output two through expander output six, to reach expander output one, even though expander outputs four, five and six may not be connected to anything. In the device of the present invention, expander outputs may be programmed off. Therefore, in the above example, channels (outputs) four, five and six may be programmed off. This would allow the user to proceed from expander 55 output two to expander 55 output three to expander 55 output one, thereby eliminating the necessity of scrolling (activating channel three command of transmitter 25 multiple times) through the unused outputs of expander 55.

Expander 55 outputs are programmed using a learn routine. Once these channels are programmed, they are stored to a memory (not shown) and in the preferred embodiment they will be retained, even if power is disconnected from controller 35 or expander 55. In the preferred embodiment, to program expander 55, the ignition switch (not shown) is turned on and off. This sends a signal to controller 35 and/or expander 55. The program input 57 is preferably a switch 57. Switch 57 is pressed the number of times equal to the channel programmed. On the last press, switch 57 is held active. For example, to program expander 55 output three, switch 57 is pressed three times and held active on the third press. In response the audio or visual transducer such as lights, siren, horn or speaker will provide feedback indicating that expander 55 output three is programmed.

As explained above, each expander output of the present invention may be programmed to a different state/mode. In the preferred embodiment, to program a specific type of mode, switch 57 is held down and the system cycles through the types of modes available and issues chirps/light-blinks to the user:

| CHIRPS | OUTPUT TYPE |
| --- | --- |
| One | pulse/validity-mode |
| Two | latch-reset-with-ignition-mode |
| Three | standard-latch-mode |
| One | 30-seconds-timed-mode |
| Two | 60-seconds-timed-mode |
| Three | 90-seconds-timed-mode |
| One long chirp | "off-mode" and exit programming |

When the user hears the indication of the desired mode he/she then releases switch 57.

After programming an expander output, the user can step to another expander 55 output and program it without exiting the program mode. The user presses switch 57 the number of times needed to step from the expander 55 output just programmed to the expander 55 output he/she wants to program. For example, if the last programmed expander 55 output is three, and the user wants to program expander 55 output five, he/she would press switch 57 two more times and hold it.

Finally, to exit the program mode, the user can do one of several things. He/she can turn the ignition on and/or wait more then fifteen seconds after any step.

Another embodiment of the present invention exits the program mode when one of the expander 55 outputs is programmed "off". This is a time saving feature. In the preferred embodiment all subsequent expander 55 outputs are programmed "off" if one is programmed "off". As an example, if expander 55 output four, of a six-output expander 55, is programmed "off", expander 55 outputs four, five and six are programmed "off" and the system exits the program routine.

The "memory-mode" discussed above is also selectable and programmable in the preferred embodiment. To select the "memory-mode" the ignition is turned on and switch 57 is held pressed down for five seconds. The system will cycle through the two memory modes of operation as shown and issue audible chirps or visual indication of the modes selected:

| CHIRPS | MODE |
| --- | --- |
| One | standard |
| Two | memory |

When the user hears/sees the mode he/she desires, switch 57 is released. The system exits the program mode when a selection is made by releasing switch 57 and/or when the ignition is turned off and/or when switch 57 is held down after or despite hearing the two chirps.

Figure 2:
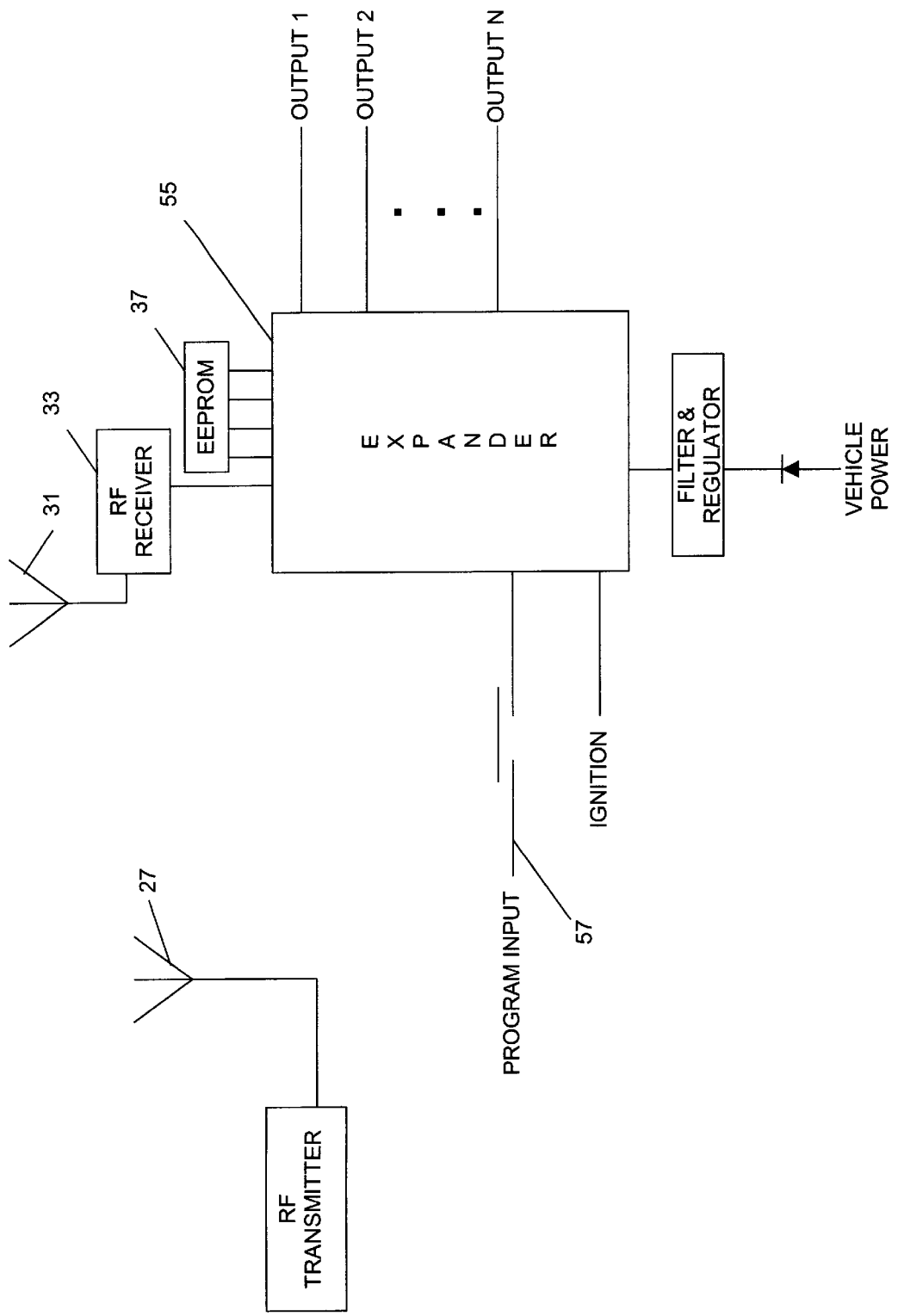
FIG. 2 is an alternate embodiment of the present invention having a resident RF antenna, receiver and decoder therewith.

Finally, in another embodiment shown in FIG. 2, expander 55 may function independent of controller 35. To function independently, expander 55 incorporates or is connected to the RF receiver 33 and memory 37. All commands sent by transmitter 25 are then received by it and it controls 'n' outputs in accordance with the command issued from transmitter 25. The device of this embodiment also has multiple modes described above, including, but not limited to the "memory-mode" and the "off-mode". However, instead of controlling expander 55 via controller 35, its expander 55 trigger output and sequential commands through the expander 55 trigger output, commands can be sent via transmitter 25 to expander 55 directly. Thus, to control expander 55 output two, for example, the user can simply push button two of his/her remote.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

We claim:

1. A system having at least one output channel, said system comprising: a transmitter, having at least one switch activating an encoder encoding and transmitting at least one channel command to a receiver connected to a decoder, the decoder decoding the command and sending the command to a controller having an expander trigger output triggering an expander having at least one expander output programmable to at least one user selectable mode.

2. The system of claim 1 further comprising an off-mode.

3. The system of claim 1 further comprising a latch-reset-with-ignition-mode.

4. The system of claim 1 further comprising a latch-mode.

5. The system of claim 1 further comprising a timed-mode.

6. The system of claim 1 further comprising a memory allowing said expander to operate the last operated expander output in response to said expander trigger output received from said controller.

7. The system of claim 1 further comprising an audio free, visual response confirming which said expander output was operated in response to said expander trigger output received from said controller.

8. The system of claim 1 further comprising an audio, visual free response confirming which said expander output was operated in response to said expander trigger output received from said controller.

9. The system of claim 1 further comprising an audio and visual response confirming which said expander output was operated in response to said expander trigger output received from said controller.

10. The system of claim 1 further comprising a memory to store a state of said controller so that when said controller is reconnected to power said controller returns to the same state as said controller was prior to being disconnected from power.

11. The system of claim 1 further including a visual response.

12. The system of claim 1 further including a visual free response.

13. The system of claim 1 further comprising a memory-mode.

14. The system of claim 1 further comprising a validity-mode.

15. The system of claim 1 further comprising a pulse-mode.

16. The device of claim 1 further including a visual free and audio free response.

17. A system comprising a transmitter, having at least one switch, activating an encoder encoding and transmitting at least one channel command to a receiver connected to a decoder, the decoder decoding the command and sending the command an expander having at least one expander output programmable to at least one user selectable mode.

18. The system of claim 17 further comprising an off-mode.

19. The system of claim 17 further comprising a latch-reset-with-ignition-mode.

20. The system of claim 17 further comprising a latch-mode.

21. The system of claim 17 further comprising a timed-mode.

22. The system of claim 17 further including an audio free, visual response confirming which said expander output was operated in response to said channel command received from said transmitter.

23. The system of claim 17 further including an audio, visual free response confirming which said expander output was operated in response to said channel command received from said transmitter.

24. The system of claim 17 further including an audio and visual response confirming which said expander output was operated in response to said channel command received from said transmitter.

25. The system of claim 17 further comprising a memory to store a state of said controller so that when said controller is reconnected to power said controller returns to the same state as said controller was prior to being disconnected from power.

26. The system of claim 17 further including a visual response.

27. The system of claim 17 further including a visual free response.

28. The system of claim 17 further including a visual free and audio free response.

29. The system of claim 17 further comprising a memory-mode.

30. The system of claim 17 further comprising a validity-mode.

31. The system of claim 17 further comprising a pulse-mode.

32. The system of claim 17 further comprising a memory allowing said expander to operate at least one last operated said at least one expander output.

* * * * *